United States Patent [19]
Acampora et al.

[11] Patent Number: 4,789,983
[45] Date of Patent: Dec. 6, 1988

[54] WIRELESS NETWORK FOR WIDEBAND INDOOR COMMUNICATIONS

[75] Inventors: Anthony Acampora, Freehold; Jack H. Winters, Middletown, both of N.J.

[73] Assignee: American Telephone and Telegraph Co., AT&T Bell Laboratories, Murray Hill, N.J.

[21] Appl. No.: 22,255

[22] Filed: Mar. 5, 1987

[51] Int. Cl.$^4$ ............................................. H04J 3/14
[52] U.S. Cl. ........................................ 370/96; 370/84
[58] Field of Search ...................... 370/94, 95, 96, 109, 370/29, 13.1, 17, 97, 84; 379/58, 61, 63; 371/5

[56] References Cited

U.S. PATENT DOCUMENTS

| | | | |
|---|---|---|---|
| 4,251,865 | 2/1981 | Moore et al. | 370/96 |
| 4,301,533 | 11/1981 | Acampora et al. | 370/104 |
| 4,309,764 | 1/1982 | Acampora | 370/83 |
| 4,398,289 | 8/1983 | Schoute | 370/94 |
| 4,606,044 | 8/1986 | Kudo | 370/84 |
| 4,692,919 | 9/1987 | West, Jr. | 370/96 |
| 4,742,514 | 5/1988 | Goode et al. | 370/97 |

OTHER PUBLICATIONS

Komura et al., Japan Telecomm. Rev., Quarterly, vol. 15, No. 4, 1973, pp. 257–261.
Acampora, BSTJ, vol. 58, No. 9, Nov. 1979, pp. 2097–2111.
Gfeller, IBM Discl. Bul, vol. 24, No. 8, Jan. 1982, pp. 4043–4046.
Acampora, IEEE Jrnl on SAC, vol. SAC-1, Jan. 1983, pp. 133–142.
Acampora et al., IEEE Communications Magazine, vol. 22, No. 8, Aug. 1984, pp. 12–21.
Mednick, Globecom '85, New Orleans, La., vol. 1, pp. 15.2.1 to 15.2.6.
Yen et al., Globecom '85, New Orleans, La., vol. 3, pp. 39.1.1 to 39.1.4.

*Primary Examiner*—Douglas W. Olms
*Assistant Examiner*—Melvin Marcelo
*Attorney, Agent, or Firm*—Erwin W. Pfeifle

[57] ABSTRACT

The present invention relates to a wideband communication network using wireless radio transmissions either on a stand-alone basis or to supplement a hard-wired network. The exemplary network comprises (a) a plurality of transceivers associated with separate users of the network; (b) optionally at least one concentrator associated with certain separate subgroups of wireless and possibly hard-wired transceivers for providing duplex operation; and (c) a central node (i) capable of providing both duplex communications directly via a radio channel using radio links with certain subgroups of the transceivers and via a hard-wired connection with each optional concentrator, and (ii) for polling the needs of all transceivers and directing all packets of information from active transceivers through the central node and to the destined transceivers during each frame period. The network also preferably includes diversity and resource sharing techniques to provide added protection against channel impairments on an as-needed basis.

10 Claims, 2 Drawing Sheets

WIRELESS NETWORK FOR WIDEBAND INDOOR COMMUNICATIONS

TECHNICAL FIELD

The present invention relates to a wideband communication network using radio either on a stand-alone basis or to supplement a hard-wired network where complete portability of office design is desired.

DESCRIPTION OF THE PRIOR ART

Local Area Networks (LANs) have included many different architectures such as the bus, loop, ring, star, tree, etc. One such LAN is disclosed in the article "A New Local Area Network Architecture Using A Centralized Bus" by A. Acampora et al. in *IEEE Communications Magazine*, Vol. 22, No. 8, August 1984, at pages 12-21. There, a centralized bus is used with all user devices being hard-wired to a central node as shown in FIGS. 1-3 of the article.

Indoor wireless communications networks have also been developed over the years. In the article "Cordless Telephone System" by M. Komura et al., published in the *Japanese Telecommunications Review*, Vol. 15, No. 4, 1973, at pages 257-261, a cordless radio telephone system is disclosed which permits telephones to communicate via radio to a localized antenna which is directly connected to a base station. Another technique for wireless indoor communication is disclosed by F. Gfeller in the *IBM Technical Disclosure Bulletin*, Vol. 24, No. 8, January 1982, at pages 4043-4046 wherein an infrared microbroadcasting network for in-house data communication is disclosed. There, a host controller is directly connected to a plurality of spaced-apart transponders for transmitting 2-way communications via infrared signals with the various stations forming the in-house system.

More recently, an office information network was disclosed in *Globecom '85*, Vol. 1, Dec. 2-5, 1985, New Orleans, La. at pages 15.2.1-15.2.6 wherein a slotted-ring access protocol and a dynamic bandwidth allocation scheme offering preferential service to high-priority traffic is provided. There, a dual optical fiber ring, transmitting in opposite directions, propagates the communication signals to various nodes along the fibers. Connections between the network nodes and local facilities or servers are copper pairs or, where appropriate, wireless drops.

Indoor radio communication is not without problems, however. Buildings in general, and office buildings in particular, present a harsh environment for high-speed radio transmission because of numerous reflections from stationary objects such as walls, furniture, and movable objects such as people. The link between a given pair of transmitters and receivers is thereby corrupted by severe multipath distortion arising from the random superimposition of all reflected rays, and by shadow fading caused by the absence of line-of-sight paths. At low data rates, the effects of multipath can be characterized by Raleigh fading, while at higher rates the channel additionally exhibits dispersion over the communication band. Shadow fading is spectrally flat and characterized by a log-normal distribution.

It is to be understood that all effects vary dynamically with time as the environment slowly changes. Raleigh fading produces a wide variation in the level of signals arriving at a particular receiver from different transmitters, thereby precluding the use of standard techniques for multiple access of the radio channel. Dispersion within the channel produces serious intersymbol interference, thereby limiting the maximum data rate of the channel and causing a fraction of users to experience an unacceptably high bit error rate, and a link experiencing such condition is said to have suffered an outage and is temporarily unavailable. Therefore, the problem in the prior art is to provide a technique or network which will permit as high a data rate as possible while encountering changing conditions.

SUMMARY OF THE INVENTION

The foregoing problem in the prior art has been solved in accordance with the present invention which relates to a wireless network for wideband indoor communications using radio as the transmission medium either on a stand-alone basis or to supplement a hard-wired network. The present exemplary wideband indoor packet communications network comprises (1) a plurality of transceivers; and (2) a central node. In addition, one or more concentrators associated with certain separate groups of wireless, and possibly hard-wired, transceivers, may be present. Each transceiver is associated with a separate user of the network, and, some or all of the plurality of transceivers communicate wirelessly with associated interface units in the concentrators or central node. The central node comprises (a) means for determining and communicating the necessary transmission requireements to each of the active plurality of wireless transceivers during a first subperiod of each frame period, and (b) means for receiving packets of information from each of the plurality of transceivers, transmitted as instructed by the communicating means, and retransmitting the packets to the transceivers of the destined users during a second subperiod of the frame period. More particularly, the communicating means of the central node (i) determines the packet transmission requirements and any transmission impairments of each network user when communicating with the associated interface unit in a concentrator or central node, and (ii) causes the transceivers associated with users determined to have packet transmission requirements to transmit their packets of information with a length sufficient to overcome the determined transmission impairment.

It is also an aspect of the present invention to provide a wideband indoor communications network as descsribed above where (1) diverstiy antennas can be used at the concentrators and central node, and one or more antennas can be used at each transceiver, and (2) access to the radio channel used by all wireless transceivers is performed by a modified polling scheme which permits resource sharing to provide added protection against channel impairments on an asneeded basis.

Other and further aspects of the present invention will become apparent during the course of the following description and by reference to the accompanying drawings.

DETAILED DESCRIPTION

Figure 1:
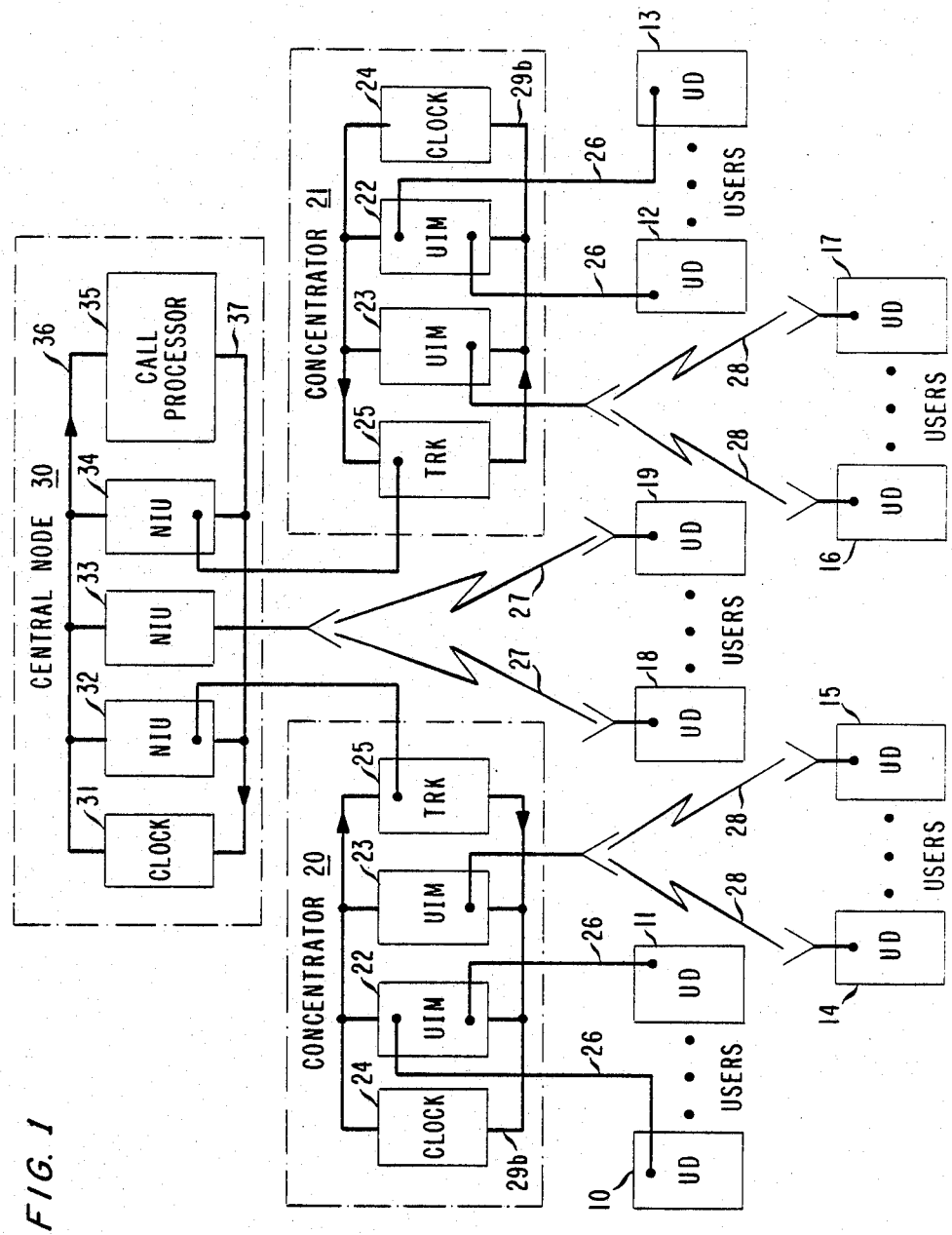
FIG. 1 is a block diagram of an exemplary arrangement of a wideband communication network in accordance with the present invention including various hard-wired and wireless user connections.

FIG. 1 illustrates an exemplary system topology which is functionally that of a star Local Area Network (LAN) comprising a central node 30, remote concentrators 20 and 21, and a plurality of user devices 10–19. Each user device 10–19 is associated with a separate user of the network and can communicate with central node 30 (1) via a hard-wired connection 26, as shown for the indirect connections between user devices 10–13 and concentrators 20 and 21; or (2) via a wireless link as shown for (a) the channel comprising links 27 between a subgroup of user devices 18–19 and central node 30, or (b) the indirect channel comprising links 28 between a subgroup of users 14–15 and a subgroup of users 16–17 and concentrators 20 and 21, respectively. It is to be understood that user devices 10–19 can each be coupled to a separate user terminal (not shown) such as, for example, a data device, printer, personal computer, host computer, telephone, etc.

Each of remote concentrators 20 and 21 is positioned between the associated subgroup of user terminals 10–17 and central node 30 and is shown as including (a) user interface modules (UIM) 22 and 23 which are each coupled to a separate portion of the associated subgroup of user devices 10–17 (b) a clock module 24, and (c) a trunk module 25. It is to be understood that each of exemplary concentrators 20 and 21 includes only two UIMs, for purposes of simplicity and that additional UIMs could be disposed in parallel with UIMs 22–23 shown, and connected to other portions of the associated user devices (not shown) via either separate hard-wired or wireless connections.

Each UIM 22 or 23 functions to translate the protocol of the signal received from the associated user devices to a standard protocol of the network as used by central node 30. The translated signal is then transmitted, at the appropriate time, to trunk module 25 on a time division multiplex (TDM) basis via a concentrator bus $29_a$ for transmission to central node 30, and vice versa for the other direction of two-way communications using concentrator bus $29_b$. Where a user device already transmits and receives signals using the standard network protocol, an associated UIM need only transmit the received signal at the appropriate time based on the received clock signals from clock module 24. The trunk module 25 in each of remote concentrators 20 and 21 functions to transmit each of the signals associated with that concentrator between each of the UIMs 22 and 23 and central node 30 at the appropriate times. The clock modules 24 provide the timing signals for each of the UIMs 22 and 23, and trunk module 25 to achieve coordinated operation within the associated remote concentrator 20 or 21. Central node 30 is shown as including a clock module 31 for providing the clock signals used in central node 30; network interface units (NIU) 32–34 which are each coupled either to a separate one of remote concentrators 20 or 21 or to a separate subgroup of one or more user devices; a call processor 35; and buses 36 and 37.

To describe the operation of the present network, the network components associated only with hard-wired user devices, e.g., user devices 10–13, UIMs 22 and NIUs 32 and 34 will first be considered. Each hard-wired user device 10–13 is shown connected to the network via terminal interface wires 26 and a UIM 22. Continuous (voice) or bursty (data) traffic arriving at UIM 22 in concentrator 20 from user devices 10–11, or at UIM 22 in concentrator 21 from user devices 12–13, are formed into fixed length packets for time-multiplexed high speed transmission to central node 30 via trunk module 25. Each such packet is provided therein with a logical channel number which allows central node 30 to re-route the packet to the appropriate concentrator 20 or 21 where the indicated destination user's device is connected. Central node 30 includes a contention bus 36, 37 operating at the speed of each high speed link, to accomplish this re-routing. All traffic, including that traffic arising at a particular concentrator 20 or 21 and destined for that same concentrator, is routed through central node 30.

The receiving concentrator demultiplexes all arriving packets from central node 30 for distribution via bus $29_b$ to the appropriate UIM and transmission to the destined user device. Logical channel numbers are preferably assigned for the entire network at the beginning of a predetermined time period of communications by call processor 35 in central node 30. Additional device configurations and operational details are described in the article "A New Local Area Network Architecture Using A Centralized Bus" by Acampora et al. in *IEEE Communications Magazine*, Vol. 22, No. 8, August 1984, at pages 12–21.

Radio links may be introduced, as shown in FIG. 1, via either a wireless link between a UIM 23 in either one of concentrators 20 or 21 as shown for link 28, or a wireless link directly to a NIU 33 in central node 30 as shown for link 27. For link 27, the high-speed links from trunk modules 25 in concentrators 20 and 21 to central node 30 have been augmented by the inclusion of an NIU 33 in central node 30 which becomes a radio base station providing a high-speed channel to collect traffic from a subgroup of radio user devices 18–19 located throughout the building. It is to be understood that the term channel hereinafter implies full duplex operation, with separate bands used to transmit to and receive from NIU 33. This radio channel operates at a rate less than or equal to that of the central node's contention buses 36 and 37 and each of the high-speed links between trunk modules 25 and NIU's 32 and 34. With an appropriate access protocol, the radio channel may be shared among all radio users 18–19 and appear, to central node 30, as a virtual concentrator. Fixed length packets arriving over links 27 contend for the nodal bus 36 along with packets arriving via high-speed buses at NIUs 32 and 34 from trunk modules 25. The packets arriving from the wired links 26 may be rerouted by central node 30 to a radio link 27, and vice-versa, according to a destination address included in each packet.

A wireless link 28 establishes a communication path from each user of a subgroup of users, 14–15 or 16–17, to an associated UIM 23 in one of remote concentrators 20 or 21. Although multiple paths are established within a subgroup of users associated with a UIM 23 or NIU 33, these links time-share a single radio channel. More particularly, at any moment, only one radio user of a subgroup of users may access the radio channel. It should be noted that there is no need to provide an aggregate data rate over all radio links 27 or 28 in excess of the transmission speed of central node 30 since all packets must be routed through central node 30. Therefore, it is pointless to reuse the radio channel among user subgroups, as this increased capacity could not be used. Thus, by sharing a single channel, operating at the speed of central node 30, among all radio users, each user can potentially access the full system bandwidth, and interference among clusters caused by simultaneous use of the channel by users in different clusters is avoided. From the perspective of central node 30, a radio link 28 established from each concentrator 20 or 21 to each of its subgroups of radio users appears as another wired port (UIM 22) on the concentrator.

Regarding the radio or wireless links only, each of the UIMs 23 or NIU 33 are preferably equipped with multiple antennas for diversity to protect against multipath fading, and each user device 14-19 is preferably equipped with only a single antenna, although multiple antennas could be used. The combination of limited diversity at the concentrators 20 and 21, and central node 30, along with resource sharing can be used to provide arbitrarily high availability. No direct communication is permitted among users, since all users may communicate only with concentrators 20 or 21 or central node 30. It should be understood that common media access techniques, such as Carrier Sense Multiple Access (CSMA), are inappropriate in the radio environment because free space path loss and multipath fading result in too large a variation of signal strength to insure that all channel usage can be detected. To keep the wireless user devices 14-19 inexperience, sophisticated timing requirements should be avoided. Finally, because of problems with delay spread, it is desired that the throughput of the system not be significantly reduced by a media access technique, and separate receive and transmit channels must be provided to allow full duplex operation.

For the present network shown in FIG. 1, an exemplary modified polling technique is used, with central node 30 controlling the transmit token. Polling is performed by call processor 35 in central node 30; with the radio UIMs 23, located at concentrators 20 and 21, and NIU 33, located at central node 30, being slaved to processor 35 such that, at any point in time, only one UIM 23 or NIU 33 is allowed to transmit the token to its community of UDs. It should be understood that all of radio UDs 14-19 time share a single radio channel without frequency reuse.

Figure 2:
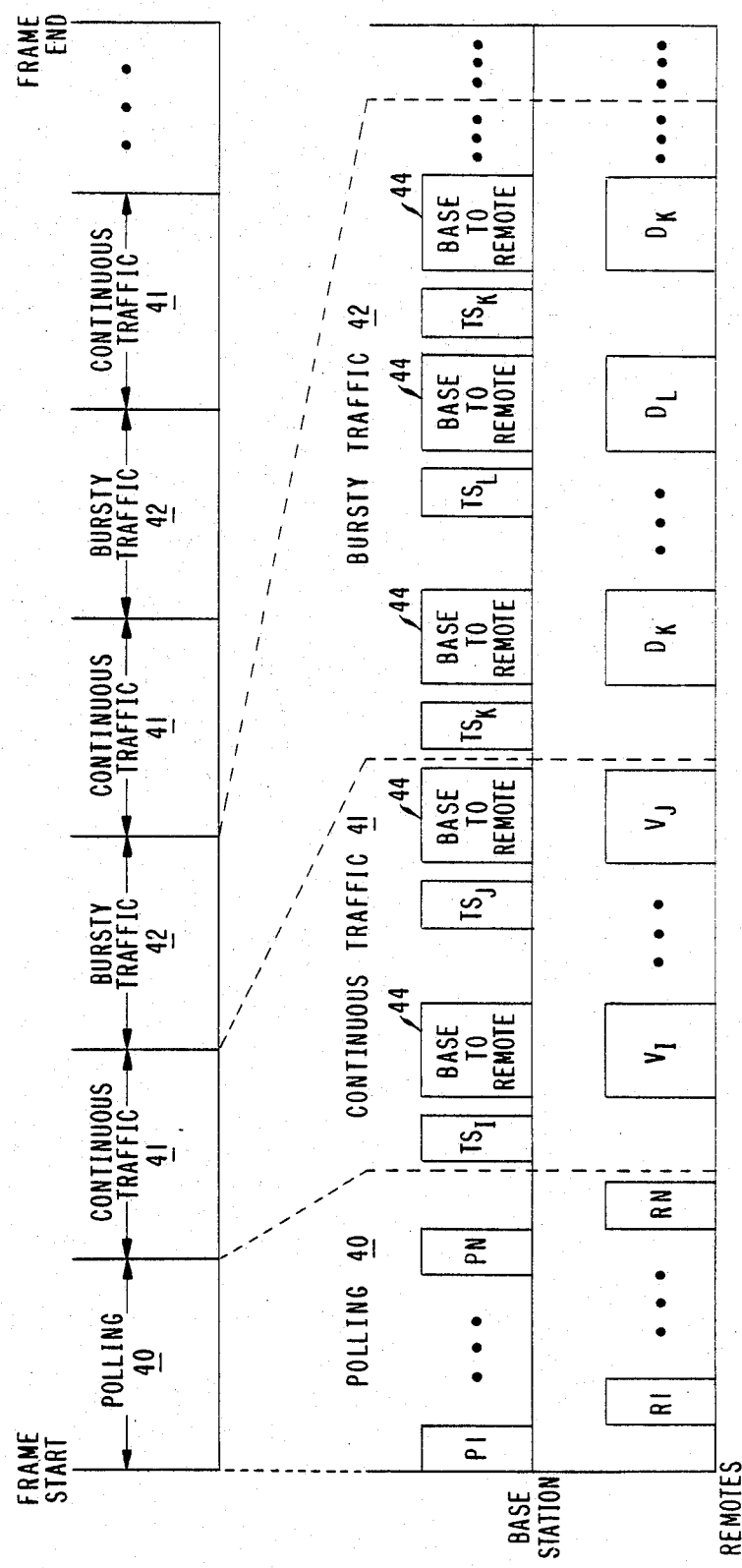
FIG. 2 is a diagram of a media access technique using polling that can be employed in the network of FIG. 1.

The present exemplary polling technique for use with the radio channel associated with the wireless UDs 14-19 is shown in FIG. 2. There, time is divided into a sequence of fixed length intervals called frames, as shown at the top of FIG. 2. At the start of each frame a polling interval 40 appears, followed by multiple intervals for transmission of continuous (voice) traffic packets 41, and bursty (data) traffic packets 42. The length of the continuous traffic intervals 41 depends on the amount of continuous traffic. This continuous traffic is transmitted periodically, at least once per frame period, with the time interval between continuous traffic intervals used for bursty traffic. Transmission of one fixed length packet per continuous traffic interval constitutes some standard grade service, e.g., 64 kbps. Continuous traffic UDs may request multiples of this basic rate by accessing multiple time slots per continuous traffic interval. The polling sequence is shown at the bottom two lines of FIG. 2 for transmissions from and to central node 30.

The following steps forming the exemplary overall transmission sequence for the radio channel are:
1. Via the UIMs 23 located at concentration 20 and 21, and NIU 33, call processor 35 at central node 30 sequentially polls each UD associated with the radio channel using sub-packets P1-PN.
2. When polled, UDs 14-19 sequentially respond, after being polled, using the associated one of packets R1-RN as to whether the UD has continuous or bursty traffic, and, if bursty traffic, the number of blocks of data.
3. Processor 35 then sequentially sends a signal, i.e., transmit token, $TS_I-TS_J$, to each continuous traffic user to send one fixed length packet, designated $V_I$ to $V_J$, including a preset number of data symbols in each packet.
4. Processor 35 then sequentially sends a signal, designated $TS_K-TS_L$, i.e., a transmit token, to each bursty traffic user to send their first data block designated packets $D_K-D_L$, then the second data block, etc.
5. During steps 3 and 4, while the UDs are transmitting to concentrators 20 and 21 in blocks $V_I-V_J$ and $D_K-D_L$, processor 35, through the UIMs 23 at the concentrators, is transmitting voice and data to the UDs 14-17 in associated blocks 44.
6. When it is time again for continuous traffic to be transmitted, then step 3 is reiterated.
7. When it is time again for polling, i.e., the beginning of another frame, then step 1 is reiterated.

The above described polling technique meets necessary requirements since (a) the system handles continuous traffic, i.e., periodic data or voice, with priority, (b) the system has the same maximum data rate for each use, i.e., a fair distribution of resources, which depends on the system loading, (c) there is no timing requirements at the remote UDs 14-19, (d) the throughput on the channel is not significantly reduced by this technique because the polling has a low duty cycle, mainly due to the short propagation delays between the concentrators 20, 21 and the remote UDs 14-19, and (e) the system has duplex operation.

What must also be considered is that in a multipath environment, paths of different lengths cause delay spread at a receiver. The delay spread, i.e., the dispersion or frequency selective fading in the channel, produces intersymbol interference which limits the maximum data rate in a given building and depends primarily on the rms delay spread and not the delay spread function. Thus, within the coverage area, there is some probability that the received signal bit error rate (BER) for each UD is more than the required value, hereinafter called the outage probability. If one UD 14-19 does not work in one location, the user can move the UD or its antenna. However, the delay spread may vary slowly with time as people and objects move within the building. Therefore, it is desirable to keep the outage probability due to delay spread as low as possible so that the wireless system is almost as reliable as any wired portion of the system.

In addition to the technique described above, resource sharing can be used to increase the maximum data rate and/or decrease the outage probability. With resource sharing, users normally transmit at some high rate $R_1$. When channel conditions between concentrators 20 or 21, or central node 30, and a particular UD no longer permits operation at this high rate., the rate is lowered to some value such as $R_2$ such that the BER objective is maintained. Such techniques are well known in the satellite system art as disclosed, for example, in the articles by A. S. Acampora in *BSTJ*, Vol. 58, No. 9, November 1979, at pages 2097-2111; and *IEEE Journal On Selected Areas In Communications*, Vol. SAC-1, Jan. 1983, at pages 133-142 where a pool of spare time slots are used, and each packet is transmitted with or without coding, to reduce the outage probability. Although it takes longer to complete transmission at this lower rate, the number of users simultaneously slowed down is usually a small fraction of the total population, and the overall throughput remains high. More particularly, during non-fade conditions, convolutional codes with a large channel signaling alphabet are employed to permit a high rate of information transfer as described hereinbefore for the 7-step transmission sequence, and when the fade depth exceeds the built in fade margin, the signaling alphabet is reduced and enough time slots are borrowed from a resource sharing reserved time slot pool to maintain the data rate at the fade site. From the prior art, it is known that a small pool of spare time slots can protect a large community of users. In the present technique, the use of coding during fade events is not considered because the channel is dispersive.

Implementation of resouce sharing with two transmission rates requires modification of the 7-step media access technique described hereinbefore. With resource sharing, transmission would normally be at the higher rate $R_1$ during non-transmission impairment periods. If errors are detected at the higher rate via standard error detection techniques, a receiver in UDs 14-19, UIMs 23, or NIU 33 can request call processor 35 to schedule a retransmission of the last block of data at the lower rate $R_2$. Call processor 35 would then cause the transmitter to retransmit the last block of information during a subsequent corresponding continuous 41 or bursty 42 traffic period at the lower data using, for example, a longer block $V_i$, $D_i$, or 44, or two or more equal length blocks. A transmitter for accomplishing such technique of resource sharing is described, for example, in U.S. Pat. No. 4,309,764 issued to A. Acampora on Jan. 5, 1982, and the previously cited article to A. Acampora in *BSTJ*, Vol. 58, No. 9, November 1979, at pages 2097-2111. Periodically the transmitter can retry transmission at the higher rate. The frequency of retries depends on the dynamics of the delay spread in the channel. Requests for lower rate transmission and retries at the higher rate need only occur infrequently since the channel normally varies very slowly with time.

What is claimed is:

1. A wideband packet communication network comprising:

a plurality of transmitters (10-19), each transmitter being associated with a separate user or group of users of the network for transmitting packets of information between an active user or group of users and the network via either one of a hard-wired or wireless connection during a frame period; and a central node (30) for communicating with each of the plurality of transmitters via the hard-wired or wireless connection, the central node comprising, processor means (35) for (a) determining packet transmission requirements associated with each transmitter communicating with the central node via a wireless connection during a first subperiod of each frame period, (b) causing each wireless transmitter determined to have a packet transmission requirement, to transmit its packets of information during a separate second subperiod of time of each frame period, (c) detecting during the first and/or second subperiods of each frame period, transmission impairments associated with each wireless transmitter, and (d) causing packets of information transmitted from each transmitter determined to have a transmission impairment to be transmitted at a transmission rate sufficient to lessen the determined transmission impairment, and means (32-34) for (a) receiving packets of information from the plurality of transmitters of the network, and (b) retransmitting the packets to receivers associated with the destined users of the packets of information via an appropriate hard-wired or wireless connection.

2. A wideband packet communication network according to claim 1 wherein the receiving and retransmitting means comprises:

a high-speed bus for propagating packets of information from the plurality of transmitters on a time division multiplexed basis; and a plurality of network interface units (NIUs), each NIU being associated with a separate subgroup of one or more of the plurality of transmitters, and connected to the tramsitters of the separate subgroup via a wireless communication link or separate hard-wired connections for receiving the packets of information from the associated subgroup of transmitters and transmitting each packet over the high-speed bus during a free time slot period to the NIU associated with a user destined to receive the packet of information.

3. A wideband packet communication network according to claim 2 wherein the network further comprises:

at least one concentrator, each concentrator being disposed between a separate subgroup of the plurality of transmitters and a predetermined one of the plurality of NIUs, each concentrator comprising:

a plurality of user interface modules (UIM), each UIM providing duplex communications with a separate portion of the subgroup of transmitters associated with the concentrator, where at least one of the subgroup portions communicates with its UIM via a separate wireless link, a trunk module for providing duplex communications between the UIMs of the concentrator and the predetermined associated one of the plurality of NIUs in the central node on a time division multiplexed basis, and a bus for propagating packets of information between the plurality of UIMs of the concentrator and the trunk module on a time division multiplexed basis.

4. A wideband packet communication network according to claim 1, 2 or 3 wherein the processor means comprises:

means responsive to the beginning of a frame period for (a) sequentially sending first control signals ($P_i$) to each of the plurality of transmitters and sequentially receiving second control signals ($R_i$) from the transmitters indicative of whether or not a transmitter has a packet of information to be transmitted during the frame period, and (b) in response to each received second control signal indicating that a transmitter is active and has a packet of information to be sent, sequentially transmitting third control signals ($TS_i$) to the active transmitters for causing the packet of information to be sent by the transmitter for routing by the central node to a destined user of the packet of information.

5. A wideband packet communication network according to claim 4 wherein
the receiving and retransmitting means in the central node comprises means for detecting that a packet of information was received from a transmitter with a bit error rate that is less than a predetermined value, and for generating a separate transmission impairment control signal to the determining and causing means; and
the determining and causing means is responsive to a transmission impairment control signal from the receiving and retransmitting means for transmitting a subsequent second control signal to the transmitter detected as having a transmission impairment for causing the transmitter to retransmit the packet of information at a slower data rate using a predetermined resource sharing technique.

6. A wideband packet communication network according to claim 5 wherein
the receiving and retransmitting means includes diversity antennas associated with wireless connections.

7. A wideband packet communication network according to claim 1,2 or 3 wherein
the receiving and retransmitting means includes diversity antennas associated with the wireless connections.

8. A method of transmitting information between a plurality of transmitters and a central node, including a processor means, via either one of a hard-wired or wireless connection during a frame period in a wideband packet communication network, each transmitter being associated with a separate user or group of users of the network, the method comprising the steps of:
(a) the processor means in the central node determining the packet transmission requirements of each transmitter communicating with the central node during a first subperiod of time of each frame period;
(b) causing a wireless transmitter determined in step (a) to have packet transmission requirements, to transmit its packets of information during a separate second subperiod of time of each frame period;
(c) the processor means detecting, during the first and/or second subperiods of time of each frame period, transmission impairments associated with each wireless transmitter; and
(d) the processor means causing packets of information transmitted from each transmitter determined to have a transmission impairment in step (c) to be transmitted at a transmission rate sufficient to lessen the determined transmission impairment.

9. A method according to claim 8 wherein the method comprises the further steps of:
in performing step (a) performing the substeps of
(a1) the processor means sequentially transmitting first control signals ($P_i$) to each of the plurality of transmitters, and
(a2) sequentially receiving second control signals ($R_i$) from the plurality of transmitters indicative of whether or not a transmitter has a packet of information to be transmitted during the frame period; and in performing step (b), performing the step of
(b1) in response to each received second control signal in step (a2) indicating that a transmitter is active and has a packet of information to be sent, sequentially transmitting third control signals ($TS_i$) to the active transmitters for causing the packet of information to be sent by the transmitter for routing by the central node to a destined user of the packet of information.

10. A method according to claim 8 or 9 wherein in performing step (c) performing the substeps of:
(c1) detecting at the central node that a packet of information was received from a transmitter with a bit error rate that is less than a predetermined value;
(c2) transmitting a subsequent second control signal to the transmitter detected as having a transmission impairment in response to the detection of a bit error rate more than a predetermined value in step (c1); and
(c3) a transmitter having a transmission impairment being responsive to a subsequent second control signal transmitted in step (c2) for retransmitting the packet of information at a slower transmission rate using a predetermined resource sharing technique such that the packet of information is received at the central node with a bit error rate below the predetermined value.

* * * * *